T. L. MORTON.
INNER TUBE FOR TIRES.
APPLICATION FILED JULY 7, 1919.
1,331,023.  Patented Feb. 17, 1920.
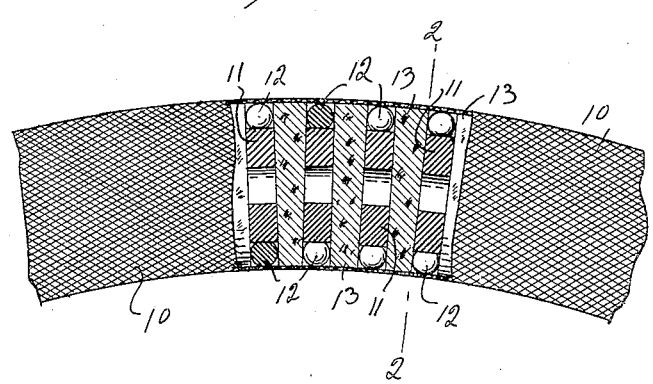
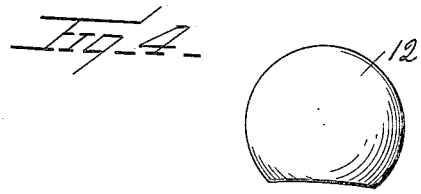
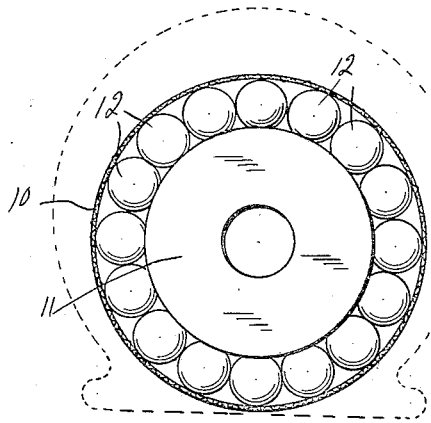
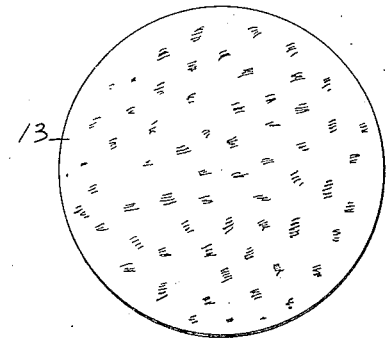
Inventor
T. L. Morton
By Watson E. Coleman
Attorney

UNITED STATES PATENT OFFICE.

THEODORE L. MORTON, OF NEW ORLEANS, LOUISIANA.

INNER TUBE FOR TIRES.

1,331,023.

Specification of Letters Patent.  Patented Feb. 17, 1920.

Application filed July 7, 1919. Serial No. 309,036.

*To all whom it may concern:*

Be it known that I, THEODORE L. MORTON, a citizen of the United States, residing at New Orleans, in the parish of Orleans and State of Louisiana, have invented certain new and useful Improvements in Inner Tubes for Tires, of which the following is a specification, reference being had to the accompanying drawings.

This invention relates to automobile or like tires, using shoes, and particularly to a core, as it may be called, designed to take the place of the ordinary inner tube which is pneumatically inflated.

The ordinary inner tube is a constant source of annoyance, inasmuch as it is very liable to punctures, and it is also liable to be pinched and worn so that it blows out.

The object of my invention is to do away with these inconveniences by the provision of a novel form of inner tube or core, as it may be termed, designed to fill the space within the shoe of the tire, and so constructed that it will be puncture-proof, or rather that punctures shall not do any damage.

A further object is to provide a core of this character which cannot puncture or blow out, which will ride as smoothly as a pneumatic tire, can be used with rubber or canvas shoes, and which is very cheap in comparison with the ordinary inner tube, particularly when its wearing qualities are taken into consideration.

My invention is illustrated in the accompanying drawings, wherein:—

Figure 1 is a fragmentary elevation of a portion of an inner tube or core for tires constructed in accordance with my invention, the tube being shown partly in section;

Fig. 2 is a section on the line 2—2 of Fig. 1, showing a shoe in dotted lines; and Fig. 3 is a face view of one of the cork blocks 13.

Fig. 4 is a perspective of one of the balls or bodies 12.

Referring to these figures, it will be seen that this tire core or inner tube consists of an annular, composite body, composed of an outer tube of thin wire gauze, designated 10. Disposed centrally within the wire gauze are a plurality of annular rubber disks 11 which have a diameter less than the internal diameter of the wire gauze tube 10, and exterior to these disks, that is between the disks and the tube, are disposed a plurality of rubber bodies 12 which have a diameter equal to the thickness of the disk 11, or which may be slightly greater in diameter than the thickness of the disk, these bodies practically filling the space between the periphery of the disk and the tube. Disposed between each disk 11 and its peripheral series of rubber bearing balls is a disk 13 of cork or like material, which is solid, and which disk has its opposite faces convergently disposed. These disks are so placed within the gauze tube that that portion of each disk having the greatest thickness will be at the outside of the tube, while the portion having the least thickness will be at the inside of the tube. The tube of wire gauze, when filled, is pulled together by clips to hold it in place until the wire ends meet. These wire ends are then interwoven with each other, so as to connect the wire ends and make practically a circular, endless tube entirely filled with the annular disks, the peripheral balls, and the intermediate disks of cork or like material.

The tire is adapted for use in all motor vehicles, and may, of course, vary in size according to the weight and size of the vehicle with which it is to be used. The tire economizes rubber, and as the tube is inclosed, cannot be affected by climatic conditions. This core or inner tube is to be disposed within the shoe of the tire in the usual manner, and when in place these tires cannot be damaged by puncture and cannot blow out.

Preferably, the bodies or balls 12 are globular in form and the inner face of each ball is flattened or rendered slightly concave so as to fit against the edge of the corresponding disks 11.

While I have described the detailed construction of my inner tube, yet I wish it understood that changes might be made in the details of construction and arrangement of parts within the scope of the appended claims without departing from the invention.

I claim:—

1. An inner tube for pneumatic tires comprising a tube of flexible material, a plurality of annular disks disposed at intervals within the tube, a plurality of elastic balls disposed around the periphery of said disks between the disks and the tube, and intermediate blocks of yielding, somewhat elastic material disposed between the sets of disks and balls.

2. An inner tube for pneumatic tires comprising a circular tube of wire gauze, a series of spaced disks of cork disposed within the wire gauze tube and having their opposite faces converging inwardly, annular disks of rubber disposed between the disks of cork, and rubber balls disposed around the peripheries of the annular disks and between each pair of cork disks.

3. An inner tube for pneumatic tires comprising a circular tube of wire gauze, a series of spaced disks of cork disposed within the wire gauze tube, annular disks of rubber disposed between the disks of cork, and globular bodies of rubber disposed around the peripheries of the annular disks and between each pair of cork disks, the inner face of each globular body being slightly concave to fit upon and against the convex surface of the rubber disks.

In testimony whereof I hereunto affix my signature in the presence of two witnesses.

THEODORE L. MORTON.

Witnesses:
JOHN F. CANE, Jr.,
JOSEPH PERNOLLET.